(12) United States Patent
Hong et al.

(10) Patent No.: US 11,574,748 B2
(45) Date of Patent: Feb. 7, 2023

(54) ULTRA HIGH VOLTAGE DIRECT CURRENT POWER CABLE SYSTEM

(71) Applicant: LS CABLE & SYSTEM LTD., Anyang-si (KR)

(72) Inventors: Sung Pyo Hong, Ansan-Si (KR); Su Bong Lee, Gumi-si (KR); Eui Hwan Jung, Gumi-si (KR); O Hyuck Kwon, Gumi-si (KR); Seung Woo Cho, Busan (KR); Sun Kak Kim, Daejeon (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 18 days.

(21) Appl. No.: 17/293,305

(22) PCT Filed: Sep. 4, 2019

(86) PCT No.: PCT/KR2019/011386
§ 371 (c)(1),
(2) Date: May 12, 2021

(87) PCT Pub. No.: WO2020/101161
PCT Pub. Date: May 22, 2020

(65) Prior Publication Data
US 2022/0013249 A1 Jan. 13, 2022

(30) Foreign Application Priority Data

Nov. 15, 2018 (KR) .......................... 10-2018-0140793

(51) Int. Cl.
*H01B 7/20* (2006.01)
*H01B 3/44* (2006.01)
(Continued)

(52) U.S. Cl.
CPC ............ *H01B 3/441* (2013.01); *H01B 7/0009* (2013.01); *H01B 7/0275* (2013.01); *H01B 9/027* (2013.01)

(58) Field of Classification Search
CPC ... H01B 1/22; H01B 1/24; H01B 3/30; H01B 3/307; H01B 3/441; H01B 4/12;
(Continued)

(56) References Cited

U.S. PATENT DOCUMENTS 4,831,214 A * 5/1989 Wilck ................... H02G 15/184
156/49
5,606,149 A * 2/1997 Yaworski ............. H02G 15/184
174/92

(Continued)

FOREIGN PATENT DOCUMENTS

JP H09252523 A 9/1997
JP 2846616 B2 1/1999
(Continued)

OTHER PUBLICATIONS

International Search Report for related International Application No. PCT/KR2019/011386; report dated May 22, 2020; (5 pages).
(Continued)

*Primary Examiner* — William H. Mayo, III
(74) *Attorney, Agent, or Firm* — K&L Gates LLP

(57) ABSTRACT

An ultra-high-voltage DC power cable system capable of simultaneously preventing or minimizing electric field distortion, a reduction of DC dielectric strength, and a reduction of impulse breakdown strength due to the accumulation of space charges in an insulating layer of a cable and an insulating material of an intermediate connection part.

20 Claims, 2 Drawing Sheets

(51) Int. Cl.
*H01B 7/00* (2006.01)
*H01B 7/02* (2006.01)
*H01B 9/02* (2006.01)

(58) Field of Classification Search
CPC ........ H01B 7/02; H01B 7/0291; H01B 9/006; H01B 9/027; H01B 13/26; H02G 1/14; H02G 1/1273; H02G 15/08; H02G 15/184; H02G 15/113
USPC .................. 174/110 R–110 SC, 113 R, 84 R
See application file for complete search history.

(56) References Cited

U.S. PATENT DOCUMENTS

| | | | | |
|---|---|---|---|---|
| 2002/0039654 | A1* | 4/2002 | Gustafsson | C08K 5/01 428/375 |
| 2004/0065456 | A1* | 4/2004 | Belli | H01B 7/288 174/105 R |
| 2010/0132976 | A1* | 6/2010 | Tognali | H02G 15/10 174/120 FP |
| 2011/0017509 | A1* | 1/2011 | Galletti | H01B 3/28 252/511 |
| 2012/0205137 | A1* | 8/2012 | Fjellner | F16L 53/37 174/116 |
| 2015/0075839 | A1* | 3/2015 | Sun | C09D 123/06 427/120 |
| 2015/0380128 | A1* | 12/2015 | Josefsson | H01B 9/006 156/53 |
| 2018/0287354 | A1* | 10/2018 | Ghorbani | H02G 1/14 |
| 2018/0309273 | A1* | 10/2018 | Caimi | H02G 1/1273 |
| 2019/0295737 | A1* | 9/2019 | Caimi | H01B 1/24 |

FOREIGN PATENT DOCUMENTS

| | | |
|---|---|---|
| JP | 2007325441 A | 12/2007 |
| KR | 20120086072 A | 8/2012 |
| KR | 101457799 B1 | 11/2014 |
| KR | 20180111459 A | 10/2018 |
| KR | 20180115175 A | 10/2018 |

OTHER PUBLICATIONS

Written Opinion for related International Application No. PCT/KR2019/011386; report dated May 22, 2020; (5 pages).

Extended European Search Report for related European Application No. 19883982.1; action dated Jul. 6, 2022; (14 pages).

* cited by examiner

ULTRA HIGH VOLTAGE DIRECT CURRENT POWER CABLE SYSTEM

CROSS-REFERENCE TO RELATED APPLICATIONS

The present application is a National Stage of International Application No. PCT/KR2019/011386 filed on Sep. 4, 2019, which claims the benefit of Korean Patent Application No. 10-2018-0140793, filed on Nov. 15, 2018, filed with the Korean Intellectual Property Office, the entire contents of each hereby incorporated by reference.

FIELD

The present disclosure relates to an ultra-high-voltage direct-current (DC) power cable system. Specifically, the present disclosure relates to an ultra-high-voltage DC power cable system capable of simultaneously preventing or minimizing electric field distortion, a reduction of DC dielectric strength, and a reduction of impulse breakdown strength due to the accumulation of space charges in an insulating layer of a cable and an insulating material of an intermediate connection part.

BACKGROUND

In general, in a large power system requiring large-capacity and long-distance power transmission, high voltage transmission is necessary to increase a transmission voltage in terms of a reduction of power loss, a construction site problem, and an increase in power transmission capacity.

Power transmission methods may be largely classified into an alternating-current (AC) power transmission method and a direct-current (DC) power transmission method. The DC power transmission method refers to transmission of power by direct current. Specifically, in the DC power transmission method, first, a power transmission side converts AC power into an appropriate voltage, converts the voltage into direct current by a converter, and transmits the direct current to a power reception side via a transmission line, and the power reception side converts the direct current into AC power by an inverter.

In particular, the DC transmission method has been widely used because this method is advantageous in transmitting a large amount of power over a long distance and can be operated in connection with an asynchronous power system, and a loss rate of direct current is low and a stability thereof is high in long-distance transmission, compared to alternating current.

An insulator of a (ultra) high-voltage DC transmission cable used in the DC transmission method may be formed of insulating paper impregnated with an insulating oil or an insulating composition containing a polyolefin resin as a base resin. Recently, as cables are likely to be operated at relatively high temperatures, an insulator formed of an insulating composition containing a polyolefin resin that increases the amount of power transmission and is free from leakage of an insulating oil have come into widespread use.

However, the polyolefin resin has a linear molecular chain structure and thus is applied to an insulating layer of a cable by improving mechanical and thermal properties of the polyolefin resin by a crosslinking process. Thus, space charges are likely to be accumulated in the insulating layer of the cable due to crosslinking by-products inevitably generated due to decomposition of a cross-linking agent during the crosslinking process. The space charges may distort an electric field in an insulator of a (ultra) high-voltage DC transmission cable and thus dielectric breakdown may occur at a voltage lower than an initially designed breakdown voltage.

Such (ultra) high-voltage DC transmission cables are installed by connecting them to each other in units of tens to hundreds of meters via an intermediate connection part. Similarly, space charges may be accumulated in an insulating material of the intermediate connection part due to crosslinking by-products inevitably generated due to decomposition of a crosslinking agent during a crosslinking process. Accordingly, an electric field in the insulating material may distort and thus dielectric breakdown may occur at a voltage lower than an initially designed breakdown voltage of the intermediate connection part.

In the case of a cable used for a current-type DC transmission (LCC) that requires polarity inversion to change a direction of power transmission, an inorganic additive such as a magnesium oxide is uniformly dispersed in an insulating layer to solve the above problem. The inorganic additive is polarized in a DC electric field and thus space charges may be trapped, thereby minimizing electric field distortion caused by the accumulation of space charges. However, in the case of voltage-type DC transmission (VSC), polarity inversion is unnecessary, and an insulating composition to which an organic additive is added is used to optimize electrical stress to be applied to an insulator of the cable. Thus, it is necessary to accurately control the amount of space charges in the insulating layer.

Accordingly, there is an urgent need for an ultra-high-voltage DC power cable system capable of simultaneously preventing or minimizing electric field distortion, a decrease of DC dielectric strength, and a decrease of impulse breakdown strength due to the accumulation of space charges in an insulating layer of a cable or an insulating material of an intermediate connection part.

SUMMARY

The present disclosure is directed to providing an ultra-high-voltage direct-current (DC) power cable system capable of simultaneously preventing or minimizing electric field distortion, a decrease of DC dielectric strength and a decrease of impulse breakage strength due to the accumulation of space charges.

According to an aspect of the present disclosure, provided is an ultra-high-voltage direct current (DC) power cable system comprising: a pair of DC power cables each including a conductor formed by combining a plurality of wires, a cable inner semiconducting layer surrounding the conductor, a cable insulating layer, and a cable outer semiconducting layer, wherein ends of the pair of DC power cables in which the conductors, the cable inner semiconducting layers, the cable insulating layers, and the cable outer semiconducting layers are sequentially exposed are disposed to face each other; a connector connection part configured to electrically and mechanically connecting the conductors exposed at the ends of the pair of DC power cables; and an intermediate connection part surrounding the connector connection part and the ends of the pair of DC power cables in which the conductors, the cable inner semiconducting layers, the cable insulating layers, and the cable outer semiconducting layers are sequentially exposed, wherein the intermediate connection part comprises: an intermediate connection part inner semiconducting layer surrounding the connector connection part; an intermediate connection part insulating layer surrounding the intermediate connection part inner semiconducting layer; an intermediate connection part outer semiconducting layer surrounding the intermediate connection part insulating layer; and an intermediate connection part protective sheath layer surrounding the intermediate connection part outer semiconducting layer, the intermediate connection part insulating layer is formed of an insulating composition containing polyolefin resin and a crosslinking agent, and a thickness of the intermediate connection part insulating layer is divided into three equal parts including an inner layer, an intermediate layer, and an outer layer, wherein a total amount of each of acetophenone (AP) and α-methyl styrene (α-MS) among crosslinking by-products included in the inner layer, a total amount of each of acetophenone and α-MS among crosslinking by-products included in the intermediate layer, and a total amount of each of acetophenone and α-MS among crosslinking by-products included in the outer layer are 1,000 ppm or less.

According to another aspect of the present disclosure, provided is the ultra-high-voltage DC power cable system, wherein an average amount of each of the crosslinked by-products contained in each of the inner layer, the intermediate layer, and the outer layer is 800 ppm or less.

According to other aspect of the present disclosure, provided is the ultra-high-voltage DC power cable system, wherein a field enhancement factor (FEF) defined by the following Equation 1 is 130% or less:

$$FEF=(\text{maximally increased electric field in insulating sample/electric field applied to insulating sample})*100, \qquad \text{[Equation 1]}$$

wherein the insulating sample is prepared by crosslinking the insulating composition of the intermediate connection part insulating layer and has a thickness of 100 to 200 μm, the electric field applied to the insulating sample is a DC electric field of 20 to 50 kV/mm applied to electrodes connected to opposite sides of the insulating sample, and the maximally increased electric field in the insulating sample is a maximum value among increase values of the electric field during the application of the DC electric field of 20 to 50 kV/mm to the insulating sample for one hour.

According to other aspect of the present disclosure, provided is the ultra-high-voltage DC power cable system, wherein a breakdown voltage of the intermediate connection part insulating layer is 490 kV/mm or more.

According to other aspect of the present disclosure, provided is the ultra-high-voltage DC power cable system, wherein the polyolefin resin comprises polyethylene resin.

According to other aspect of the present disclosure, provided is the ultra-high-voltage DC power cable system, wherein the crosslinking agent comprises a peroxide crosslinking agent.

According to other aspect of the present disclosure, provided is the ultra-high-voltage DC power cable system, wherein the peroxide crosslinking agent comprises at least one selected from the group consisting of dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, and di-t-butyl peroxide.

According to other aspect of the present disclosure, provided is the ultra-high-voltage DC power cable system, wherein the insulating composition further comprises at least one additive selected from the group consisting of an antioxidant, an extrudability enhancer and a crosslinking aid.

According to other aspect of the present disclosure, provided is the ultra-high-voltage DC power cable system, wherein the intermediate connection part insulating layer is formed by cross-winding and crosslinking a non-crosslinking insulating tape containing the insulating composition.

According to other aspect of the present disclosure, provided is the ultra-high-voltage DC power cable system, wherein the conductor connection part is formed by welding ends of a pair of the conductors together.

According to other aspect of the present disclosure, provided is the ultra-high-voltage DC power cable system, wherein a semiconductive composition of the intermediate connection part inner semiconducting layer or the intermediate connection part outer semiconducting layer comprises a crosslinking agent in an amount of 0.1 to 5 parts by weight, based on 100 parts by weight of a base resin of the semiconductive composition.

According to other aspect of the present disclosure, provided is the ultra-high-voltage DC power cable system, wherein the base resin comprises at least one selected from the group consisting of ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso) propyl acrylate (EPA), ethylene (iso) propyl methacrylate (EPMA), ethylene butyl acrylate (EBA), and ethylene butyl methacrylate (EBMA).

According to other aspect of the present disclosure, provided is the ultra-high-voltage DC power cable system, wherein the cable insulating layer is formed of an insulating composition containing polyolefin resin and a crosslinking agent, and when a thickness of the cable insulating layer is divided into three equal parts including an inner layer, an intermediate layer, and an outer layer, the amounts of acetophenone (AP) and α-methyl styrene (α-MS) among crosslinked by-products contained in each of the inner layer, the intermediate layer, and the outer layer are 1000 ppm or less and an average amount thereof is 800 ppm or less.

According to other aspect of the present disclosure, provided is the ultra-high-voltage DC power cable system, wherein the amount of each of acetophenone (AP) and α-methyl styrene (α-MS) contained in the inner layer of the cable insulating layer is 800 ppm or less.

According to other aspect of the present disclosure, provided is the ultra-high-voltage DC power cable system, wherein a field enhancement factor (FEF) defined by the following Equation 1 is 130% or less:

$$FEF=(\text{maximally increased electric field in insulating sample/electric field applied to insulating sample})*100, \qquad \text{[Equation 1]}$$

wherein the insulating sample is prepared by crosslinking the insulating composition of the cable insulating layer and has a thickness of 100 to 200 μm, the electric field applied to the insulating sample is a DC electric field of 20 to 50 kV/mm applied to electrodes connected to opposite sides of the insulating sample, and the maximally increased electric field in the insulating sample is a maximum value among increase values of the electric field during the application of the DC electric field of 20 to 50 kV/mm to the insulating sample for one hour.

According to other aspect of the present disclosure, provided is the ultra-high-voltage DC power cable system, wherein the polyolefin resin comprises polyethylene resin.

According to other aspect of the present disclosure, provided is the ultra-high-voltage DC power cable system, wherein the crosslinking agent comprises a peroxide crosslinking agent.

According to other aspect of the present disclosure, provided is the ultra-high-voltage DC power cable system, wherein the peroxide crosslinking agent comprises at least one selected from the group consisting of dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, and di-t-butyl peroxide.

According to other aspect of the present disclosure, provided is the ultra-high-voltage DC power cable system, wherein the insulating composition further comprises at least one additive selected from the group consisting of an antioxidant, an extrudability enhancer and a crosslinking aid.

According to other aspect of the present disclosure, provided is the ultra-high-voltage DC power cable system, wherein a semiconductive composition of the inner semiconducting layer and the outer semiconducting layer of the power cable comprises a crosslinking agent in an amount of 0.1 to 5 parts by weight, based on 100 parts by weight of a base resin of the semiconductive composition.

According to other aspect of the present disclosure, provided is the ultra-high-voltage DC power cable system, wherein the base resin comprises at least one selected from the group consisting of ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso) propyl acrylate (EPA), ethylene (iso) propyl methacrylate (EPMA), ethylene butyl acrylate (EBA), and ethylene butyl methacrylate (EBMA).

According to other aspect of the present disclosure, provided is the ultra-high-voltage DC power cable system comprising: a pair of DC power cables each including a conductor formed by combining a plurality of wires, a cable inner semiconducting layer surrounding the conductor, a cable insulating layer, and a cable outer semiconducting layer, wherein ends of the pair of DC power cables in which the conductors, the cable inner semiconducting layers, the cable insulating layers, and the cable outer semiconducting layers are sequentially exposed are disposed to face each other; a conductor connection part configured to electrically and mechanically connecting the conductors exposed at the ends of the pair of DC power cables; and an intermediate connection part surrounding the connector connection part and the ends of the pair of DC power cables in which the conductors, the cable inner semiconducting layers, the cable insulating layers, and the cable outer semiconducting layers are sequentially exposed, wherein the intermediate connection part comprises: an intermediate connection part inner semiconducting layer surrounding the connector connection part; an intermediate connection part insulating layer surrounding the intermediate connection part inner semiconducting layer; an intermediate connection part outer semiconducting layer surrounding the intermediate connection part insulating layer; and an intermediate connection part protective sheath layer surrounding the intermediate connection part outer semiconducting layer, wherein the cable insulating layer is formed of an insulating composition containing polyolefin resin and a crosslinking agent, and a thickness of the cable insulating layer is divided into three equal parts including an inner layer, an intermediate layer, and an outer layer, wherein a total amount of each of acetophenone (AP) and α-methyl styrene (α-MS) among crosslinking by-products included in the inner layer, a total amount of each of acetophenone and α-MS among crosslinking by-products included in the intermediate layer, and a total amount of each of acetophenone and α-MS among crosslinking by-products included in the outer layer are 1,000 ppm or less.

In an ultra-high-voltage direct current (DC) power cable system according to the present disclosure, the amount of a specific crosslinking byproduct generated during cross-linking can be accurately controlled by adjusting a degree of crosslinking by control of the amount of a crosslinking agent to be added to an insulating layer of a cable and an insulating material of an intermediate connection part and appropriate modification of a base resin, thereby simultaneously preventing or minimizing electric field distortion, a reduction of a decrease of DC dielectric strength, and a reduction of impulse breakdown strength due to the accumulation of space charges in the insulating layer and the insulating material.

DETAILED DESCRIPTION

Hereinafter, example embodiments of the present disclosure will be described in detail. The present disclosure is, however, not limited thereto and may be embodied in many different forms. Rather, the embodiments set forth herein are provided so that this disclosure may be thorough and complete and fully convey the scope of the disclosure to those skilled in the art. Throughout the specification, the same reference numbers represent the same elements.

Figure 1:
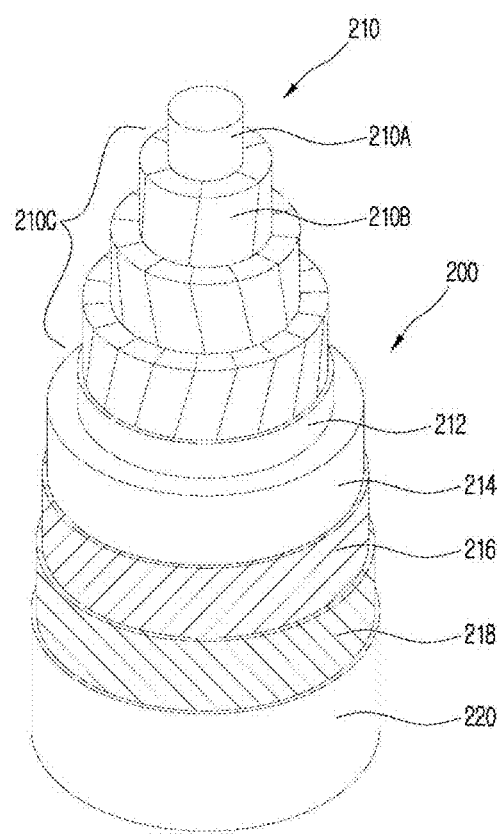
FIG. 1 is a schematic cross-sectional view of an ultra-high-voltage direct-current (DC) power cable applied to an ultra-high-voltage DC power cable system, according to an embodiment of the present disclosure.

FIG. 1 is a schematic cross-sectional view of an ultra-high-voltage direct-current (DC) power cable applied to an ultra-high-voltage DC power cable system according to an embodiment of the present disclosure.

Referring to FIG. 1, a power cable 200 includes a cable core part including a conductor 210 formed by combining a plurality of wires, an inner semiconducting layer 212 surrounding the conductor 210, an insulating layer 214 surrounding the inner semiconducting layer 212, and an outer semiconducting layer 216 surrounding the insulating layer 214, and configured to transmit power along the conductor 210 only in a longitudinal direction of the power cable 200 and prevent leakage of current in a radial direction of the power cable 200.

The conductor 210 acts as a current flow path to transmit power and may be formed of a material, e.g., copper or aluminum, which has high conductivity to minimize power loss and has strength and flexibility appropriate to manufacture and use a cable. The conductor 210 may be either a circularly compressed conductor manufactured by combining a plurality of round strands and compressing the twisted round strands into a round shape or a flat conductor having a round cross-section and including a flat strand layer 210C consisting of a round center strand 210A and flat strands 210B twisted to surround the round center strand 210A. The flat conductor has a higher space factor than that of the circularly compressed conductor and thus an outer diameter of a cable may decrease when the flat conductor is used.

However, because the conductor 210 is formed by combining a plurality of strands, a surface thereof is not smooth and thus an electric field may not be uniform and a corona discharge is likely to occur therein locally. In addition, when a gap occurs between the surface of the conductor 210 and the insulating layer 214 described later, insulation performance may decrease. In order to solve the above problems, the inner semiconducting layer 212 is formed outside the conductor 210.

The inner semiconducting layer 212 is formed by adding conductive particles, such as carbon black, carbon nanotubes, carbon nanoplates or graphite, to an insulating material and thus has semiconductivity, and prevents a sudden electric field change between the conductor 210 and the insulating layer 214 described later, thereby stabilizing insulation performance. In addition, the inner semiconducting layer 212 suppresses an uneven charge distribution on a surface of the conductor 210 to achieve a uniform electric field and prevents the occurrence of a gap between the conductor 210 and the insulating layer 214 to suppress a corona discharge, dielectric breakdown, etc.

The insulating layer 214 is provided outside the inner semiconducting layer 212 to electrically insulate the inner semiconducting layer 212 from the outside, thereby preventing current flowing through the conductor 210 from leaking to the outside. In general, a breakdown voltage of the insulating layer 214 should be high and insulation performance thereof should be stably maintained for a long time. Furthermore, the insulating layer 214 should have low dielectric loss and have heat resistance performance. Accordingly, the insulating layer 214 may be formed of a polyolefin resin such as polyethylene and polypropylene, and preferably, a polyethylene resin. Here, the polyethylene resin may be a cross-linked resin.

The outer semiconducting layer 216 is provided outside the insulating layer 214. Similar to the inner semiconducting layer 12, the outer semiconducting layer 216 is formed of a material having semiconductivity by adding conductive particles, such as carbon black, carbon nanotubes, carbon nanoplates, or graphite, to an insulating material, and suppresses a non-uniform charge distribution between the insulating layer 214 and a metal sheath 218 described later, thereby stabilizing insulation performance. In addition, the outer semiconducting layer 216 planarizes a surface of the insulating layer 214 of the cable to mitigate electric field concentration so as to prevent a corona discharge, and physically protects the insulating layer 214.

The core part of the cable, and particularly, the inner semiconducting layer 212, the insulating layer 214, and the outer semiconducting layer 216 are parts in which electric field distortion is most likely to occur due to generation, accumulation or injection of space charges and dielectric breakdown is most likely to result from the electric field distortion, as will be described in detail later.

The core part may further include a moisture absorbing layer to prevent moisture from penetrating the cable. The moisture absorbing layer may be formed between the twisted strands and/or outside the conductor 210, and be in the form of powder, tape, a coating layer or a film containing a super absorbent polymer (SAP) capable of quickly absorbing moisture penetrating the cable and having excellent capability of maintaining a state of absorbing the moisture to prevent penetration of moisture in the longitudinal direction of the cable. In addition, the moisture absorbing layer may have semiconductivity to prevent a sudden electric field change.

A protective sheath part is provided outside the core part. A power cable installed in an environment exposed to water, such as the seabed, further includes an outer cover part. The protective sheath part and the outer cover part protect the core part of the cable from various environmental factors, such as moisture penetration, mechanical trauma, and corrosion, which may affect power transmission performance of the cable.

The protective sheath part includes a metal sheath layer 218 and an inner sheath 220 to protect the core part of the cable from fault current, external forces or other external environmental factors.

The metal sheath layer 218 may be grounded at an end of the power cable to serve as a path through which fault current flows when an accident such as a ground fault or a short circuit occurs, protect the cable from external shocks, and prevent an electric field from being discharged to the outside of the cable. In addition, in the case of a cable installed in an environment such as the sea bottom, the metal sheath layer 218 may be formed to seal the core part to prevent degradation of insulation performance due to invasion of foreign substances such as moisture. For example, the metal sheath layer 218 may be formed to have seamless outer surfaces by extruding a molten metal outside the core part to enhance watertightness performance. The metal may be lead or aluminum, preferably, lead having excellent corrosion resistance to seawater, particularly in the case of a submarine cable, and more preferably, a lead alloy containing a metal element to supplement mechanical properties.

Furthermore, an anti-corrosion compound, e.g., blown asphalt, may be applied onto a surface of the metal sheath layer 218 to further improve corrosion resistance, watertightness, etc. of the cable and improve adhesion to the inner sheath 220. A nonwoven copper wire tape (not shown) and a moisture absorbing layer may be additionally provided between the metal sheath layer 218 and the core part. The nonwoven copper wire tape includes copper wire, a nonwoven tape, and the like to facilitate electrical contact between the outer semiconducting layer 216 and the metal sheath layer 218. The moisture absorbing layer is in the form of powder, a tape, a coating layer or a film containing a super absorbent polymer (SAP) capable of quickly absorbing moisture penetrating into the cable and maintaining a state of absorbing the moisture to prevent penetration of moisture in a longitudinal direction of the cable. In addition, copper wire may be included in the water absorbing layer to prevent a sudden electric field change in the water absorbing layer.

The inner sheath 220 formed of a resin such as polyvinyl chloride (PVC) or polyethylene is provided outside the metal sheath layer 218 to improve corrosion resistance, watertightness, etc. of the cable and protect the cable from mechanical trauma and other external environmental factors such as heat and ultraviolet rays. In particular, a polyethylene resin having excellent watertightness is preferably used in the case of a power cable laid on the sea bottom, and a polyvinyl chloride resin is preferably used in an environment requiring flame retardancy.

The protective sheath part may further include a metal reinforcement layer formed of a semiconducting non-woven fabric tape or the like and buffers an external force applied to the power cable and an outer sheath formed of a resin such as polyvinyl chloride or polyethylene so as to further improve the corrosion resistance, watertightness, etc. of the power cable and protect the power cable from mechanical trauma and other external environmental factors such as heat and ultraviolet rays.

A power cable laid on the sea bottom is easily damaged by the anchor of a ship, a bending force caused by sea currents or waves, friction with the sea bottom, and the like and thus the outer cover part may be provided outside the protective sheath part to prevent damage to the power cable.

The outer cover part may include an armor layer and a serving layer. The armor layer may be formed of steel, galvanized steel, copper, brass, bronze, or the like, and may be formed in at least one layer by cross-winding wire having a circular or flat cross section. The armor layer enhances mechanical properties and performance of the cable and additionally protects the cable from external forces. The serving layer formed of polypropylene yarn or the like is formed in one or more layers on and/or under the armor layer to protect the cable. The serving layer which is an outermost layer may be formed of two or more materials of different colors to secure visibility of the cable laid on the sea bottom.

The inner semiconducting layer 212 and the outer semiconducting layer 216 are formed by extrusion of a semiconductive composition in which conductive particles such as carbon black, carbon nanotubes, carbon nanoplates or graphite are dispersed in a base resin and a cross-linking agent, an antioxidant, a scorch inhibitor, and the like are additionally added.

Here, the base resin is preferably formed of an olefin resin similar to the base resin of the insulating composition of the insulating layer 214 for interlayer adhesion between the semiconducting layers 212 and 216 and the insulating layer 14. More preferably, the base resin is formed of olefin and a polar monomer, e.g., ethylene vinyl acetate (EVA), ethylene methyl acrylate (EMA), ethylene methyl methacrylate (EMMA), ethylene ethyl acrylate (EEA), ethylene ethyl methacrylate (FEMA), ethylene (iso) propyl acrylate (EPA), ethylene (iso) propyl methacrylate (EPMA), ethylene butyl acrylate (EBA), ethylene butyl methacrylate (EBMA) or the like, in consideration of compatibility with the conductive particles.

In addition, the cross-linking agent may be a silane cross-linking agent or an organic peroxide cross-linking agent, such as dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, or di-t-butyl peroxide, according to the method of cross-linking the base resin contained in the semiconducting layers 212 and 216.

The semiconductive composition of the inner and outer semiconducting layers 212 and 216 may include 30 to 70 parts by weight of conductive particles, such as carbon black, based on 100 parts by weight of the base resin. When the amount of the conductive particles is less than 30 parts by weight, sufficient semiconducting properties may not be realized, whereas when the amount of the conductive particles is greater than 70 parts by weight, the extrudability of the inner and outer semiconducting layers 212 and 216 may decrease and thus surface properties or productivity of the cable may be lowered.

In the semiconductive composition of the inner and outer semiconducting layers 212 and 216, the amount of the cross-linking agent may be accurately controlled to be 0.1 to 5 parts by weight, and preferably, 0.1 to 1.5 parts by weight, based on 100 parts by weight of the base resin.

Here, when the amount of the crosslinking agent is greater than 5 parts by weight, the amount of crosslinking by-products inevitably generated during crosslinking of the base resin contained in the semiconductive composition may be excessive, and the crosslinking by-products may move into the insulating layer 214 via the interface between the semiconducting layers 212 and 216 and the insulating layer 214 and thus distortion of an electric field may be accelerated due to the accumulation of heterocharges, thereby reducing a breakdown voltage of the insulating layer 214. In contrast, when the amount of the crosslinking agent is less than 0.1 parts by weight, a degree of crosslinking is insufficient and thus mechanical properties, heat resistance, etc. of the semiconducting layers 212 and 216 may be insufficient.

The insulating layer 214 may be formed of, for example, a polyolefin resin such as polyethylene or polypropylene as a base resin, and may be preferably formed by extrusion of an insulating composition containing a polyethylene resin.

The polyethylene resin may include ultra-low-density polyethylene (ULDPE), low-density polyethylene (LDPE), linear low-density polyethylene (LLDPE), medium-density polyethylene (MDPE), high-density polyethylene (HDPE), or a combination thereof. Alternatively, the polyethylene resin may include a homopolymer, a random or block copolymer of α-olefin, such as ethylene, propylene, 1-butene, 1-pentene, 1-hexene, or 1-octene, or a combination thereof.

In addition, the insulating composition of the insulating layer 214 may include a crosslinking agent and thus the insulating layer 214 may be formed of crosslinked polyolefin (XLPO), and preferably, crosslinked polyethylene (XLPE) by a separate crosslinking process during or after extrusion. Alternatively, the insulating composition may further include other additives such as an antioxidant, an extrusion enhancer, and a crosslinking aid.

The cross-linking agent contained in the insulating composition may be the same as that contained in the semiconductive composition, and may be, for example, a silane cross-linking agent or an organic peroxide cross-linking agent, such as dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, or di-t-butyl peroxide. Here, the crosslinking agent may be contained in the insulating composition in an amount of less than 1 wt %, for example, an amount of 0.1 wt % or more and less than 1 wt %, based on the total weight of the insulating composition.

The present inventors have completed the present disclosure by experimentally confirming that specific crosslinking by-products causing generation of space charges among crosslinking by-products inevitably generated during crosslinking of the insulating layer 214 were acetophenone (AP) and α-methyl styrene (α-MS), the amount of the specific crosslinking by-products, and particularly, the amount of specific crosslinking by-products at each point on a thickness of the insulating layer 214 may be limited when the amount of the crosslinking agent contained in the insulating composition for forming the insulating layer 214 was reduced to be less than 1% by weight and the insulating layer 214 was crosslinked and degassed, and generation of space charges and electric field distortion may be remarkably reduced by limiting the amount of the specific crosslinking by-products, thereby preventing or minimizing a reduction of both DC dielectric strength and impulse breakdown strength of the insulating layer 214.

Furthermore, the present inventors have completed the present disclosure through experimental confirmation that a problem that a degree of crosslinking of the insulating layer 214 may be lowered due to the limitation of the amount of the crosslinking agent to be less than 1 wt % and thus the mechanical and thermal properties of the insulating layer 214 may be lowered can be fixed by achieving a crosslinking degree of 60% or more, e.g., 60 to 70%, by increasing vinyl group content of the base resin contained in the insulating composition of the insulating layer 214.

Specifically, when the thickness of the insulating layer 214 is divided into three equal parts including an inner layer which is a lower layer right above the conductor 210, an intermediate layer on the inner layer, and an outer layer on the intermediate layer, the generation of space charges in the insulating layer 214 may be suppressed by adjusting the amounts of the crosslinking by-products in each of these layers to 1,000 ppm or less and adjusting an average thereof to 800 ppm or less, so that the field enhancement factor (FEF) of Equation 1 below representing a degree of electric field distortion in the insulating layer 214 may be adjusted to about 130% or less, and preferably, 120% or less, thereby preventing or minimizing a reduction of both the DC dielectric strength and impulse breakdown strength of the insulating layer 214.

$$FEF = (\text{maximally increased electric field in insulating sample}/\text{electric field applied to insulating sample}) \times 100 \quad [\text{Equation 1}]$$

In Equation 1 above, the insulating sample is prepared by crosslinking the insulating composition of the insulating layer 214 and has a thickness of 100 to 200 μm, the electric field applied to the insulating sample is a DC electric field of 20 to 50 kV/mm applied to electrodes connected to opposite sides of the insulating sample, and the maximally increased electric field in the insulating sample is a maximum value among increase values of the electric field during the application of the DC electric field of 20 to 50 kV/mm to the insulating sample for one hour.

Furthermore, the inner layer of the insulating layer 214 is located directly on the conductor 210, thus forming a heterogeneous interface with the inner semiconducting layer 212, and dielectric breakdown is likely to occur therein because a relatively high electric field is applied thereto. Thus, the total amount of each of the specific crosslinking by-products in the inner layer may be preferably adjusted to 1000 ppm or less, and more preferably, 800 ppm or less.

Figure 2:
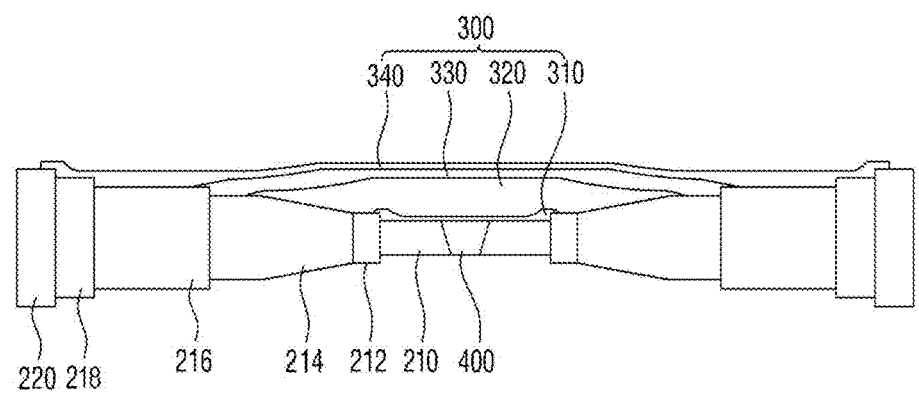
FIG. 2 is a schematic view of an ultra-high-voltage DC power cable system according to the present disclosure.

FIG. 2 is a schematic view of a structure of an ultra-high-voltage DC power cable system according to the present disclosure.

As illustrated in FIG. 2, the ultra-high-voltage DC power cable system according to the present disclosure may include a conductor connection part 400 configured to electrically and mechanically connect conductors 210 exposed at ends of a pair of DC power cables, in which the conductors 210, inner semiconducting layers 212, insulating layers 214, outer semiconducting layers 216, and the like are sequentially exposed and which are disposed to face each other; and an intermediate connection part 300 surrounding the conductor connection part 400 and the ends of the pair of DC power cables in which the conductors 210, the inner semiconducting layers 212, the insulating layers 214, and the outer semiconducting layers 216 of the cables are sequentially exposed.

Here, the connector connection part 400 may be formed by inserting a pair of the conductors 210 into a sleeve, and compressing an outer circumferential surface of the sleeve, fixing the pair of conductors 210 inserted into the sleeve by a bolt passing through the sleeve, or welding ends of the pair of conductors 210 together. Preferably, a copper crimp sleeve may be used to make an outer diameter of the sleeve substantially the same as those of the conductors 210 after compressing and machining or machining may be performed on the connector connection part 400 and the conductors 210 to make the outer diameters thereof substantially the same after welding, thereby minimizing a thickness of the intermediate connection part 300 to make the intermediate connection part 300 compact.

The intermediate connection part 300 may include an intermediate connection part inner semiconducting layer 310, an intermediate connection part insulating layer 320, an intermediate connection part outer semiconducting layer 330, and an intermediate connection part protective sheath layer 340.

The intermediate connection part inner semiconducting layer 310, the intermediate connection part outer semiconducting layer 330, and the intermediate connection part protective sheath layer 340 are configured to restore functions of the inner semiconducting layer 212, the outer semiconducting layer 216, and the inner sheath 212 of the cable which are sequentially separated in the cable connection part 400, and may be respectively formed of the same materials as the inner semiconducting layer 212, the outer semiconducting layer 214, and the inner sheath 212 of the cable. For example, the intermediate connection part inner semiconducting layer 310 may be formed by cross-winding and crosslinking a non-crosslinked tape formed of the same material as the inner semiconducting layer 21 of the cable. The intermediate connection part protective sheath layer 340 may be formed using a thermal contraction tube formed of the same material as the inner semiconducting layer 212 of the cable.

The intermediate connection part inner semiconducting layer 310 may surround the connector connection part 400 and an exposed portion of the conductor 210 and partially cover the inner semiconducting layer 212 of the cable exposed by peeling off the insulating layer 214 of the cable. The intermediate connection part outer semiconducting layer 330 may partially surround the intermediate connection part insulating layer 320, and the outer semiconducting layer 216 of the cable exposed by peeling off the metal sheath layer 218 covering the exposed insulating layer 214 of the cable, the inner sheath 220, and so on. The intermediate connection part protective sheath layer 340 may surround the intermediate connection part outer semiconducting layer 330 and partially surround at least the metal sheath layer 218 and the inner sheath 220 of the cable and so on.

Further, the intermediate connection portion internal semiconductor layer 310 and the outer semiconductive layer 330 may be formed in the same manner as the same material as the internal and outer peripheral layers 212, 216 of the cable, and the external semi-conductive layer 330 may be formed in the same material as the internal and outer peripheral layers 212, 216 of the cable. For example, the intermediate connection part inner semiconducting layer 310 and the outer semiconducting layer 330 may contain 45 to 70 parts by weight of conductive particles such as carbon black, and the amount of a crosslinking agent contained in a semiconductive composition for forming the intermediate connection part inner semiconducting layer 310 and the outer semiconducting layer 330 may be precisely adjusted to 0.1 to 5 parts by weight, and preferably, 0.1 to 1.5 parts by weight, based on 100 parts by weight of a base resin.

The intermediate connection part insulating layer 320 may surround the intermediate connection part inner semiconducting layer 310, the inner semiconducting layer 212 of the exposed cable, and the insulating layer 214 of the cable exposed by peeling off the outer semiconducting layer 216 of the cable, may be formed of the same materials (e.g., a base resin, a crosslinking agent, etc.) as the insulating layer 214 of the cable, the amount of the crosslinking agent may be the same as that of the crosslinking agent in the insulating layer 214 of the cable, and the intermediate connection part insulating layer 320 may be preferably formed by cross-winding and crosslinking a non-crosslinked insulation tape formed of the same material as the insulating layer 214 of the cable.

The intermediate connection part insulating layer 320 may include inclined surfaces on at both ends thereof in a longitudinal direction of the cable. When the insulating layers 214 of the cables are peeled off to expose the inner semiconducting layers 212 of the cables, ends of the insulating layers 214 may be penciled in the longitudinal direction of the cables as shown in FIG. 2 and the intermediate connection part insulating layer 320 may include inclined surfaces corresponding to the shape of the penciled ends of the insulating layers 214 at both ends thereof to increase the length of an interface between the insulating layers 214 and the intermediate connection part insulating layer 320, thereby improving insulation performance.

The present inventors have completed the present disclosure by experimentally confirming that specific crosslinking by-products causing generation of space charges among crosslinking by-products inevitably generated during cross-linking of the intermediate connection part insulating layer 320 were acetophenone (AP) and α-methyl styrene (α-MS), the amount of the specific crosslinking by-products, and particularly, the amount of specific crosslinking by-products at each point on a thickness of the intermediate connection part insulating layer 320 may be limited when the amount of the crosslinking agent contained in the insulating composition for forming the intermediate connection part insulating layer 320 was reduced to be less than 1% by weight and the intermediate connection part insulating layer 320 was cross-linked and degassed, and generation of space charges and electric field distortion may be remarkably reduced by limiting the amount of the specific crosslinking by-products, thereby preventing or minimizing a reduction of both DC dielectric strength and impulse breakdown strength of the intermediate connection part insulating layer 320.

Furthermore, the present inventors have completed the present disclosure through experimental confirmation that a reduction of a degree of cross-linking of the intermediate connection part insulating layer 320 and a reduction of mechanical and thermal properties of the intermediate connection part insulating layer 320, when the amount of the crosslinking agent was limited to be less than 1 wt %, can be solved by increasing a vinyl group content of a base resin contained in the insulating composition of the intermediate connection part insulating layer 320 to achieve a degree of cross-linking of 60% or more, e.g., 60 to 70%.

Specifically, when the thickness of the intermediate connection part insulating layer 320 is divided into three equal parts including an inner layer which is a lower layer right above the intermediate connection part inner semiconducting layer 310, an intermediate layer on the inner layer, and an outer layer on the intermediate layer, the generation of space charges in the intermediate connection part insulating layer 320 may be suppressed by adjusting the amounts of the crosslinking by-products in each of these layers to 1,000 ppm or less and adjusting an average thereof to 800 ppm or less, so that electric field distortion in the intermediate connection part insulating layer 320 may be suppressed, thereby preventing or minimizing a reduction of both DC dielectric strength and impulse breakdown strength of the cable connection part.

Here, the dividing of the intermediate connection part insulating layer 320 into three equal parts should be understood as dividing the intermediate connection part insulating layer 320 into three equal parts in a thickness direction.

Therefore, the FEF of Equation 1 below representing the degree of electric field distortion in the intermediate connection part insulating layer 320 may be adjusted to about 130% or less, and preferably, 120% or less, and as a result, a reduction of both the DC dielectric strength and impulse breakdown strength of the intermediate connection part insulating layer 320 may be prevented or minimized.

FEF=(maximally increased electric field in insulating sample/electric field applied to insulating sample)*100     [Equation 1]

In Equation 1 above, the insulating sample is prepared by crosslinking the insulating composition of the intermediate connection part insulating layer 320 and has a thickness of 100 to 200 μm, the electric field applied to the insulating sample is a DC electric field of 20 to 50 kV/mm applied to electrodes connected to opposite sides of the insulating sample, and the maximally increased electric field in the insulating sample is a maximum value among increase values of the electric field during the application of the DC electric field of 20 to 50 kV/mm to the insulating sample for one hour.

EXAMPLES

1. Preparation Examples of Insulating Sample of Cable

Insulating samples of a cable each having a thickness of about 150 μm were prepared, in which the amount of each of crosslinking by-products of each layer was adjusted after crosslinking by adjusting the amount of a crosslinking agent and a degassing time, as shown in Table 1 below.

TABLE 1

| | | Crosslinking byproduct content (ppm) | |
|---|---|---|---|
| | | AP | α-MS |
| comparative example 1 | inner layer | 1015 | 994 |
| | intermediate layer | 1016 | 1265 |
| | outer layer | 430 | 680 |
| | average | 820 | 980 |
| comparative example 2 | inner layer | 903 | 970 |
| | intermediate layer | 856 | 1003 |
| | outer layer | 369 | 561 |
| | average | 709 | 845 |
| example 1 | inner layer | 946 | 446 |
| | intermediate layer | 709 | 352 |
| | outer layer | 375 | 417 |
| | average | 677 | 405 |
| example 2 | inner layer | 582 | 248 |
| | intermediate layer | 470 | 163 |
| | outer layer | 245 | 126 |
| | average | 432 | 179 |

2. Preparation Examples of Intermediate Connection Part Insulating Layer

Samples of an intermediate connection part insulating layer each having a thickness of about 150 μm were prepared, in which the amount of each of crosslinking by-products of each layer was adjusted after crosslinking by adjusting the amount of a crosslinking agent and a degassing time, as shown in Table 2 below.

TABLE 2

| | | Crosslinking byproduct content (ppm) | |
|---|---|---|---|
| | | AP | α-MS |
| comparative example 3 | inner layer | 893 | 323 |
| | intermediate layer | 1553 | 1364 |
| | outer layer | 1097 | 1257 |
| | average | 1181 | 981 |
| example 3 | inner layer | 752 | 676 |
| | intermediate layer | 382 | 493 |
| | outer layer | 353 | 575 |
| | average | 496 | 581 |

2. Evaluation of Physical Properties

1) Measurement of Field Enhancement Factor (FEF) of Cable Insulating Samples

An FET of Equation 1 was measured by connecting an electrode to opposite sides of each of insulating samples of comparative examples 1 and 2 and examples 1 and 2 and applying a DC electric field of 50 kV/mm thereto for one hour. A result of the measurement is as shown in Table 3 below and FIG. 3.

TABLE 3

| | FEF (%) |
|---|---|
| comparative example 1 | 132 |
| comparative example 2 | 143 |
| example 1 | 112 |
| example 2 | 107 |

Figure 3:
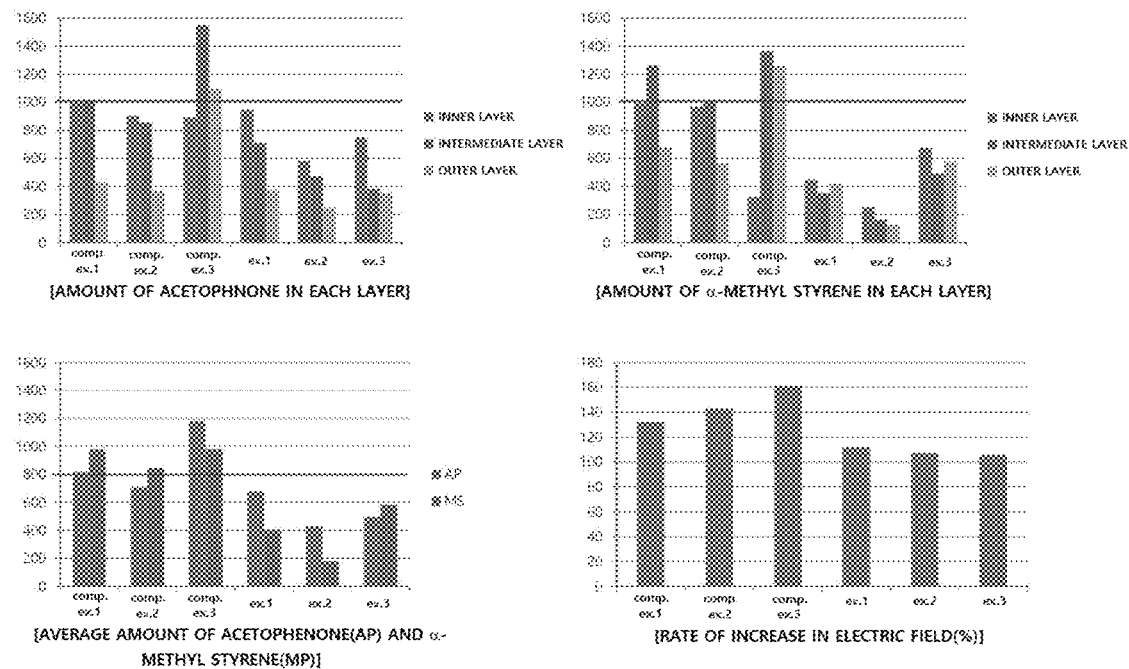
FIG. 3 is a graph showing a result of measuring field enhancement factors (FEFs) of examples of a sample of an insulating layer of an ultra-high-voltage DC power cable of an ultra-high-voltage DC power cable system according to the present disclosure.

As shown in Table 3 above and FIG. 3, in each of the insulating samples of comparative examples 1 and 2 in which the amounts of two types of specific crosslinking byproducts were not controlled, an FEF indicating electric field distortion due to generation of space charges was high, i.e., about 130% or more, and thus it is expected that dielectric strength will decrease to a large extent.

In contrast, in each of the insulating samples of examples 1 and 2 of the present disclosure, the amounts of the two types of specific crosslinking by-products were accurately controlled to suppress generation of space charges and thus an FEF indicating electric field distortion was controlled to be low, i.e., 120% or less. Therefore, it is expected that electric strength will decrease to a minimum extent.

2) Measurement of Breakdown Voltage (BDV) of Samples of Intermediate Connection Part Insulating Layer An FET of Equation 1 was measured by connecting an electrode to opposite sides of each of insulating samples of comparative example 3 and example 3 and applying a DC electric field of 50 kV/mm thereto for one hour, and a voltage applied when dielectric breakdown occurred was measured by connecting an electrode to the opposite sides of each of the insulating samples and boosting the voltage at a speed of 1 kV/s. Measurement results are as shown in Table 4 below.

TABLE 4

| | FEF (%) | BDV (kV/mm) |
|---|---|---|
| comparative example 3 | 161 | 412.5 |
| example 3 | 106 | 520.9 |

As shown in Table 4, electric field distortion occurred due to generation of space charges and thus dielectric strength decreased greatly in the case of the insulating layer samples of comparative examples 4 to 7 in which the amounts of the three types of specific crosslinking by-products of each layer and an average thereof exceeded specific levels.

In contrast, in the insulating samples of example 3 of the present disclosure, the amounts of the two types of specific crosslinking by-products of each layer and an average thereof were adjusted to a specific level or less to minimize electric field distortion due to generation of space charges and thus a breakdown voltage was maintained to be 490 kV/mm or more.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. An ultra-high-voltage direct current (DC) power cable system comprising:
a pair of DC power cables each including a conductor formed by combining a plurality of wires, a cable inner semiconducting layer surrounding the conductor, a cable insulating layer, and a cable outer semiconducting layer, wherein ends of the pair of DC power cables in which the conductors, the cable inner semiconducting layers, the cable insulating layers, and the cable outer semiconducting layers are sequentially exposed are disposed to face each other;
a connector connection part configured to electrically and mechanically connecting the conductors exposed at the ends of the pair of DC power cables; and
an intermediate connection part surrounding the connector connection part and the ends of the pair of DC power cables in which the conductors, the cable inner semiconducting layers, the cable insulating layers, and the cable outer semiconducting layers are sequentially exposed,
wherein the intermediate connection part comprises: an intermediate connection part inner semiconducting layer surrounding the connector connection part; an intermediate connection part insulating layer surrounding the intermediate connection part inner semiconducting layer; an intermediate connection part outer semiconducting layer surrounding the intermediate connection part insulating layer; and an intermediate connection part protective sheath layer surrounding the intermediate connection part outer semiconducting layer,
the intermediate connection part insulating layer is formed of an insulating composition containing polyolefin resin and a crosslinking agent, and
a thickness of the intermediate connection part insulating layer is divided into three equal parts including an inner layer, an intermediate layer, and an outer layer, wherein a total amount of each of acetophenone (AP) and α-methyl styrene (α-MS) among crosslinking by-products included in the inner layer, a total amount of each of acetophenone and α-MS among crosslinking by-products included in the intermediate layer, and a total amount of each of acetophenone and α-MS among crosslinking by-products included in the outer layer are 1,000 ppm or less.

2. The ultra-high-voltage DC power cable system of claim 1, wherein an average amount of each of the crosslinked by-products contained in each of the inner layer, the intermediate layer, and the outer layer is 800 ppm or less.

3. The ultra-high-voltage DC power cable system of claim 1, wherein a field enhancement factor (FEF) defined by the following Equation 1 is 130% or less:

FEF=(maximally increased electric field in insulating sample/electric field applied to insulating sample)*100,  [Equation 1]

wherein the insulating sample is prepared by crosslinking the insulating composition of the intermediate connection part insulating layer and has a thickness of 100 to 200 μm, the electric field applied to the insulating sample is a DC electric field of 20 to 50 kV/mm applied to electrodes connected to opposite sides of the insulating sample, and the maximally increased electric field in the insulating sample is a maximum value among increase values of the electric field during the application of the DC electric field of 20 to 50 kV/mm to the insulating sample for one hour.

4. The ultra-high-voltage DC power cable system of claim 1, wherein a breakdown voltage of the intermediate connection part insulating layer is 490 kV/mm or more.

5. The ultra-high-voltage DC power cable system of claim 1, wherein the polyolefin resin comprises polyethylene resin.

6. The ultra-high-voltage DC power cable system of claim 1, wherein the crosslinking agent comprises a peroxide crosslinking agent.

7. The ultra-high-voltage DC power cable system of claim 6, wherein the peroxide crosslinking agent comprises at least one selected from the group consisting of dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, and di-t-butyl peroxide.

8. The ultra-high-voltage DC power cable system of claim 1, wherein the insulating composition further comprises at least one additive selected from the group consisting of an antioxidant, an extrudability enhancer and a crosslinking aid.

9. The ultra-high-voltage DC power cable system of claim 1, wherein a semiconductive composition of the intermediate connection part inner semiconducting layer or the intermediate connection part outer semiconducting layer comprises a crosslinking agent in an amount of 0.1 to 5 parts by weight, based on 100 parts by weight of a base resin of the semiconductive composition.

10. The ultra-high-voltage DC power cable system of claim 9, wherein the base resin comprises at least one selected from the group consisting of ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso) propyl acrylate (EPA), ethylene (iso) propyl methacrylate (EPMA), ethylene butyl acrylate (EBA), and ethylene butyl methacrylate (EBMA).

11. The ultra-high-voltage DC power cable system of claim 1, wherein the cable insulating layer is formed of an insulating composition containing polyolefin resin and a crosslinking agent, and when a thickness of the cable insulating layer is divided into three equal parts including an inner layer, an intermediate layer, and an outer layer, the amount of each of acetophenone (AP) and α-methyl styrene (α-MS) among crosslinked by-products contained in each of the inner layer, the intermediate layer, and the outer layer are 1000 ppm or less and an average amount thereof is 800 ppm or less.

12. The ultra-high-voltage DC power cable system of claim 11, wherein the amount of each of acetophenone (AP) and α-methyl styrene (α-MS) contained in the inner layer of the cable insulating layer is 800 ppm or less.

13. The ultra-high-voltage DC power cable system of claim 12, wherein a field enhancement factor (FEF) defined by the following Equation 1 is 130% or less:

FEF=(maximally increased electric field in insulating sample/electric field applied to insulating sample)*100,  [Equation 1]

wherein the insulating sample is prepared by crosslinking the insulating composition of the cable insulating layer and has a thickness of 100 to 200 μm, the electric field applied to the insulating sample is a DC electric field of 20 to 50 kV/mm applied to electrodes connected to opposite sides of the insulating sample, and the maximally increased electric field in the insulating sample is a maximum value among increase values of the electric field during the application of the DC electric field of 20 to 50 kV/mm to the insulating sample for one hour.

14. The ultra-high-voltage DC power cable system of claim 11, wherein the polyolefin resin comprises polyethylene resin.

15. The ultra-high-voltage DC power cable system of claim 11, wherein the crosslinking agent comprises a peroxide crosslinking agent.

16. The ultra-high-voltage DC power cable system of claim 15, wherein the peroxide crosslinking agent comprises at least one selected from the group consisting of dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, and di-t-butyl peroxide.

17. The ultra-high-voltage DC power cable system of claim 11, wherein the insulating composition further comprises at least one additive selected from the group consisting of an antioxidant, an extrudability enhancer and a crosslinking aid.

18. The ultra-high-voltage DC power cable system of claim 1, wherein a semiconductive composition of the inner semiconducting layer and the outer semiconducting layer of the power cable comprises a crosslinking agent in an amount of 0.1 to 5 parts by weight, based on 100 parts by weight of a base resin of the semiconductive composition.

19. The ultra-high-voltage DC power cable system of claim 18, wherein the base resin comprises at least one selected from the group consisting of ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso) propyl acrylate (EPA), ethylene (iso) propyl methacrylate (EPMA), ethylene butyl acrylate (EBA), and ethylene butyl methacrylate (EBMA).

20. An ultra-high-voltage direct current (DC) power cable system comprising:

a pair of DC power cables each including a conductor formed by combining a plurality of wires, a cable inner semiconducting layer surrounding the conductor, a cable insulating layer, and a cable outer semiconducting layer, wherein ends of the pair of DC power cables in which the conductors, the cable inner semiconducting layers, the cable insulating layers, and the cable outer semiconducting layers are sequentially exposed are disposed to face each other;

a conductor connection part configured to electrically and mechanically connecting the conductors exposed at the ends of the pair of DC power cables; and an intermediate connection part surrounding the connector connection part and the ends of the pair of DC power cables in which the conductors, the cable inner semiconducting layers, the cable insulating layers, and the cable outer semiconducting layers are sequentially exposed, wherein the intermediate connection part comprises: an intermediate connection part inner semiconducting layer surrounding the connector connection part; an intermediate connection part insulating layer surrounding the intermediate connection part inner semiconducting layer; an intermediate connection part outer semiconducting layer surrounding the intermediate connection part insulating layer; and an intermediate connection part protective sheath layer surrounding the intermediate connection part outer semiconducting layer, wherein the cable insulating layer is formed of an insulating composition containing polyolefin resin and a crosslinking agent, and a thickness of the cable insulating layer is divided into three equal parts including an inner layer, an intermediate layer, and an outer layer, wherein a total amount of each of acetophenone (AP) and $\alpha$-methyl styrene ($\alpha$-MS) among crosslinking by-products included in the inner layer, a total amount of each of acetophenone and $\alpha$-MS among crosslinking by-products included in the intermediate layer, and a total amount of each of acetophenone and $\alpha$-MS among crosslinking by-products included in the outer layer are 1,000 ppm or less.

* * * * *